Dec. 27, 1966  TOSUN SUVOR ET AL  3,294,190
WHEEL DRIVE AND SUSPENSION ARRANGEMENT FOR TRANSPORT VEHICLE
Filed Nov. 5, 1964

TOSUN SUVOR
MICHAEL H. WINDELL
INVENTORS.

BY Lothrop & West

ATTORNEYS

United States Patent Office 3,294,190
Patented Dec. 27, 1966

3,294,190
WHEEL DRIVE AND SUSPENSION ARRANGE-
MENT FOR TRANSPORT VEHICLE
Tosun Suvor, 4801 Berksford Ave., Sacramento, Calif.
95841, and Michael H. Windell, 4427 Tresler Ave.,
North Highlands, Calif. 95660
Filed Nov. 5, 1964, Ser. No. 409,184
4 Claims. (Cl. 180—27)

Our invention relates to relatively small vehicles, such as carts or delivery wagons, which are particularly suited for use in carrying one or more persons, and perhaps also some lading over various sorts of terrain both on paved streets and off the pavement.

While there are vehicles of various sorts for individual use and for delivery purposes, most of them are relatively complicated and require expensive mechanism.

It is therefore an object of our invention to provide a transport vehicle which is considerably simplified mechanically, and which can be operated under widely variant conditions with good effect.

Another object of the invention is to provide a transport vehicle which because of its simplicity and straightforward construction, can be fabricated, serviced and operated economically and effectively.

A further object of the invention is to provide a transport vehicle which involves a number of similar sub-assemblies so that the cost and difficulty of manufacturing the vehicle are quite reduced.

Still another object of the invention is to provide a transport vehicle having at least a two-wheel drive, but in which the customarily utilized differential is dispensed with.

An additional object of the invention is to provide a transport vehicle having a low center of gravity with attendant safe and effective handling characteristics.

Yet another object of the invention is to provide a transport vehicle having individual suspension and driving systems for the rear wheels.

Other objects, together with the foregoing are attained in the embodiment of the invention and described in the accompanying description and illustrated in the accompanying drawing in which.

Figure 1:
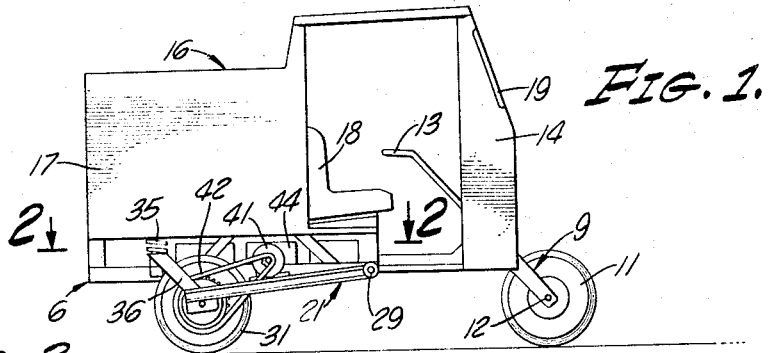
FIGURE 1 is a side elevation of a transport vehicle constructed pursuant to the invention.
Figure 2:
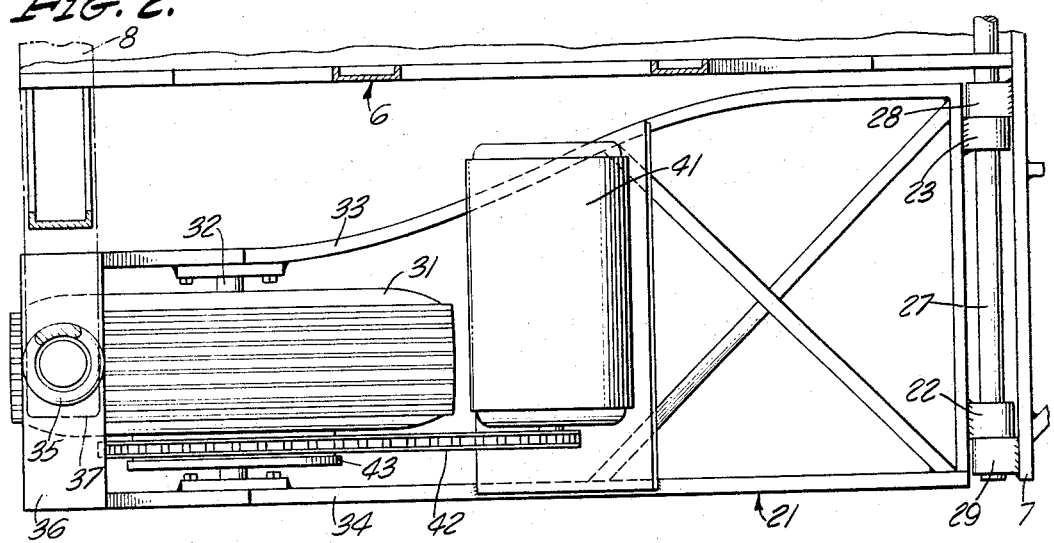
FIGURE 2 is a horizontal section of a portion of the vehicle, and to an enlarged scale, the plane of the section being indicated by the line 2—2 of FIGURE 1.
Figure 3:
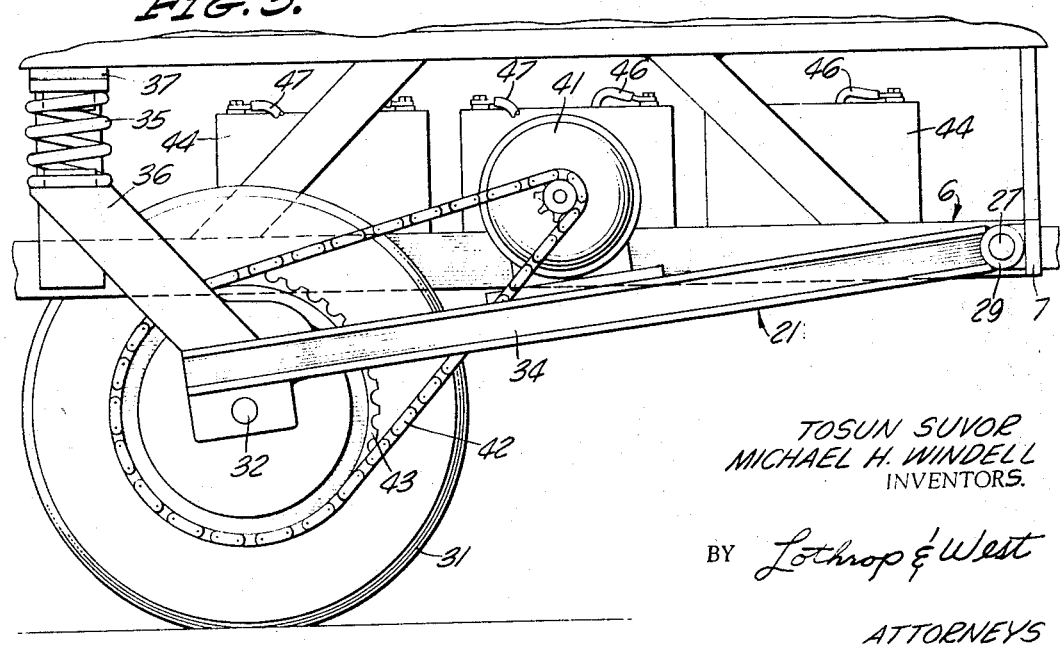
FIGURE 3 is a fragmentary side elevation to the scale of FIGURE 2 showing the parts particularly illustrated in FIGURE 2.

While the transport vehicle can be constructed in any number of different ways, and can be variously arranged for personal and lading transport, it has successfully been embodied as illustrated herein primarily for use as a postal delivery vehicle. Since the vehicle is generally symmetrical about a longitudinal vertical plane, the description herein, while particularly applicable to one side of the vehicle is intended also to apply to the other side.

In this form of device, there is provided a main frame 6. The main frame 6 is a generally rectangular, longitudinally elongated base fabricated of the customary shapes and stampings. Intermediate its ends the main frame is inclusive of a forward cross member 7 and, adjacent its rearward portion, is inclusive of a rear cross member 8.

The front end of the main frame 6 serves as a mounting for a steering mechanism 9 at one end of which a forward or front wheel 11 is mounted by means of a cross axle 12. The front wheel engages the ground and is turned for steering motion under the guidance of a suitable steering bar 13 within an operator's cab 14 forming a portion of the body 16 of the vehicle. The body 16 is mounted on the frame 6 in the customary way and preferably includes a rear cabinet 17 for the reception of lading. Located within the body at a convenient point relative to the steering bar 13 is an operator's seat 18. The operator is protected by the body and has forward visibility through a windshield 19. Other control instrumentalities, not shown, are provided for him in the vicinity of his operating station on the seat 18.

The device is substantially symmetrical, and there is disposed on one side of the main frame 6 a side frame 21 which is typical of a similar side frame arranged at the other side of the vehicle but with reversed symmetry. The frame 21 itself is elongated and is made up of a number of shapes and angles. At its forward end it carries a pair of journals 22 and 23 arranged on a pivot shaft 27 extending transversely out of the vehicle about a transverse axis and itself secured to the forward cross member 7 by mounting blocks 28 and 29. For this arrangement, the side frame 21 is able to pivot about the axis of the shaft 27 and similarly, the other side frame on the other side of the vehicle can similarly pivot about the same axis.

Adjacent its rearward or trailing end, the side frame 21 is provided with a ground engaging rear wheel 31 and, symmetrically, a similar wheel is provided on the opposite side of the vehicle. Each of the wheels is individually mounted on its own cross axle 32 mounted between the side members 33 and 34 of the side frame 21 so that the wheel 31 is freely rotatable. Each of the wheels is also provided with suitable braking mechanism, not shown, enabling the operator in the cab to effect braking as desired.

In order to relate the side frames to the main frame in yielding fashion, each of the frames, such as the frame 21, is provided with its own coil spring 35. At its lower end the spring rests upon a saddle 36 spanning the side members 33 and 34 of the side frame 21. At its upper end the spring 35 abuts the nether side of the outstanding portion 37 of the rear cross member 8. In this fashion the two rear wheels 31 are permitted to move individually in a vertical plane to accommodate the vehicle through the terrain. Since the vehicle has three wheels at least two of which are sprung, it can readily negotiate uneven territory without undue motion of the body 16.

In order to drive the individual ones of the ground engaging wheels, the frame 21 has its own electrical motor 41 mounted thereon. A similar installation is made on the other side of the vehicle. The motor 41 is connected by a sprocket chain 42 to a sprocket 43 secured to the wheel 31 so that when the motor 41 is energized in either direction, the wheel 31 is moved accordingly.

A source of electric energy is provided on the main frame 6. One or more batteries, such as 44, are suitably secured to the main frame between the two motors 41. Each of the batteries is provided with a ground connection 46 and another lead 47. The leads 47 extend to appropriate switches and controls in the cab, and, from the cab, return to the motors. The leads to the respective motors are flexible so that movement of the side frames can readily be accommodated even though the batteries and controls are on the main frame.

The electrical controls for the motors are disposed adjacent to the driver's station so that he can vary the speed of the motors in either direction and can stop them. Since the controls are of conventional variety they are not shown in detail.

In accordance with this structure there is afforded a transport vehicle which is symmetrical on both sides so that sub-assemblies of the side frames can be made and so that these side frames can readily be mounted on the main frame for individual wheel movement. Since each of the wheels is directly and individually driven by its own electric motor, there is no necessity for any differential connection between the rear wheels, thus saving costs and enabling the batteries to be lowered, with a corresponding lowering of the center of gravity and improved driving and handling qualities.

Furthermore, one of the motors can be reversed when the other is being driven forwardly to afford sharp turning of the vehicle and adroit maneuverability.

It has been found in practice that a motor vehicle of this sort is quite well adapted to the use of postmen in effectuating mail delivery despite rough terrain and small amount of room within which to maneuver. The device has long life and, being mechanically quite simple, it is easy to construct and to maintain.

What is claimed is:

1. A wheel drive and suspension arrangement for a transport vehicle comprising:
   (a) an elongated main frame;
   (b) a front steering wheel on the forward end of said main frame;
   (c) a front cross member extending across said main frame and projecting from the sides thereof;
   (d) a rear cross member extending across said main frame and projecting from the sides thereof;
   (e) a pair of elongated side frames;
   (f) means for pivotally mounting one of said side frames on said front cross member for rotation about a transverse axis;
   (g) means for pivotally mounting the other of said side frames on said front cross member for rotation about said transverse axis;
   (h) springs interposed between the trailing ends of said side frames and the projecting portions of said rear cross member;
   (i) ground engaging wheels individually rotatably mounted adjacent the trailing ends of said side frames;
   (j) individual electric motors mounted respectively on said side frames;
   (k) means for connecting said individual motors to respective ones of said ground engaging wheels;
   (l) a battery mounted on said main frame in a fore and aft location between said front cross member and said rear cross member; and,
   (m) electrical conductors extending from said battery to the respective ones of said individual electric motors.

2. The device of claim 1 wherein each of said elongated side frames includes an elongated outer side member and elongated inner side member spaced inwardly therefrom adjacent the leading ends of said members a distance approximately equal to twice the width of one of said ground engaging wheels and adjacent the after ends of said members a distance slightly exceeding said wheel width.

3. The device of claim 1 wherein the center of gravity of said battery lies approximately in a transverse vertical plane including the centers of gravity of said individual electric motors.

4. The device of claim 3 wherein the axes of rotation of said individual electric motors are substantially coincident and are transverse with respect to said elongated side frames, and said axes of motor rotation and said centers of gravity of said motors are located entirely forwardly of said ground engaging wheels.

References Cited by the Examiner

UNITED STATES PATENTS 2,966,951    1/1961    Lang _____ 180—25
3,117,648    1/1964    Landreth _____ 180—65

FOREIGN PATENTS 195,810    5/1938    Switzerland.

KENNETH H. BETTS, *Primary Examiner.*